United States Patent
Lysakovski et al.

(10) Patent No.: US 12,105,768 B2
(45) Date of Patent: Oct. 1, 2024

(54) SELECTIVITY ESTIMATION OF CONJUNCTIVE PREDICATES

(71) Applicant: SAP SE, Walldorf (DE)

(72) Inventors: Peter Lysakovski, Heidelberg (DE); Guido Moerkotte, Mannheim (DE); Norman May, Karlsruhe (DE); Diego Havenstein, Munich (DE); Gabriele Steidl, Berlin (DE)

(73) Assignee: SAP SE, Walldorf (DE)

( * ) Notice: Subject to any disclaimer, the term of this patent is extended or adjusted under 35 U.S.C. 154(b) by 932 days.

(21) Appl. No.: 16/924,455

(22) Filed: Jul. 9, 2020

(65) Prior Publication Data

US 2022/0012302 A1  Jan. 13, 2022

(51) Int. Cl.
*G06F 17/16* (2006.01)
*G06F 16/242* (2019.01)
*G06F 16/2453* (2019.01)
*G06F 17/11* (2006.01)

(52) U.S. Cl.
CPC .......... *G06F 17/16* (2013.01); *G06F 16/2428* (2019.01); *G06F 16/24545* (2019.01); *G06F 17/11* (2013.01)

(58) Field of Classification Search
CPC ... G06F 16/24–2477; G06F 16/33–337; G06F 16/432; G06F 16/532; G06F 16/632; G06F 16/732; G06F 16/83; G06F 16/832; G06F 16/903; G06F 16/9032; G06F 16/953; G06F 16/9532; G06F 17/11; G06F 17/16; G06F 17/18
See application file for complete search history.

(56) References Cited

U.S. PATENT DOCUMENTS

2007/0027837 A1* 2/2007 Kutsch .............. G06F 16/24545
2018/0341679 A1* 11/2018 Moerkotte .......... G06F 16/2455

OTHER PUBLICATIONS

J.L. Hennessy et al., Computer Architecture a Quantitative Approach, Elsevier, Fifth Edition, 2012 (Year: 2012).*
What is a Table, Database.Guide, 2016, found at https://database.guide/what-is-a-table/ (Year: 2016).*
D. Havenstein et al., Fast Entropy Maximization for Selectivity Estimation of Conjunctive Predicates on CPUs and GPUS, Proceedings of the 23rd International Conference on Extending Database Technology (EDBT), Mar. 30-Apr. 2, 2020 (Year: 2020).*
M. Muller et al., Improved Selectivity Estimation by Combining Knowledge from Sampling and Synopsis, Proceedings of the VLD Endowment, vol. 11, No. 9, 2018 (Year: 2018).*

(Continued)

*Primary Examiner* — Emily E Larocque
(74) *Attorney, Agent, or Firm* — Buckley, Maschoff & Talwalkar LLC

(57) ABSTRACT

A system includes determination of a query comprising z predicates, determination of known selectivities of each of a set of conjuncts of the z predicates, and estimation of selectivities of all conjuncts of the z predicates based on the known selectivities and a recursive determination of Cx, where x represents selectivities of all complete conjuncts of the z predicates and C is a complete design matrix complete design matrix $(c_{i,j})=1$ if $i \subseteq j$, else 0, having indices $[0, 2^z-1]$.

6 Claims, 7 Drawing Sheets

(56) References Cited

OTHER PUBLICATIONS

C. Lanczos, Solution of Systems of Linear Equations by Minimized Iterations, Journal of Research of the National Bureau of Standards, vol. 49, No. 1, 1952 (Year: 1952).*
Larson, Per-Ake et al., "Cardinality Estimation Using Sample Views with Quality Assurance", SIGMOD '07, Jun. 11-14, 2007, Beijing, China, 12pgs.
Markl, Volker et al., "Consistent selectivity estimation via maximum entropy", The VLDB Journal (2007), vol. 16, DOI:10.1007s00788-006-0030-1, (pp. 55-76, 23 total pages).
Golub, Gene H. et al., "Matrix Computations", 3rd Edition, The John Hopkins University Press, 1996, (cover p. 1+i-vi +Contents vii-xxviii+pp. 1-694, 723 total pages).
Leis, Viktor et al., "How Good Are Query Optimizers, Really?", Proccedings of the VLDB Endowment, vol. 9, No. 3, 2015, (pp. 204-215, 12 total pages).
Stillger, Michael et al., "LEO-DB2's LEarning Optimizer", Proceedings of the 27th VLDB Conference, Roma, Italy, 2001, 10pgs.
Gemulla, Rainer et al., "Maintaining Bernoulli Samples over Evolving Multisets", PODS'07, Jun. 11-14, 2007, Beijing, China, 10pgs.
Harville, David A. "Matrix Algebra From a Statistician's Perspective", http://www.gbv.de/dms/goettingen/228932173, downloaded Jul. 15, 2020, 8pgs.
Moerkotte, Guido et al., "Proximal Operator of Quotient Functions with Application to a Feasibility Problem in Query Optimization", HAL archives-ouvertes, HAL ID: hal-00942453, Feb. 5, 2014, 16pgs.
Poosala, Viswanath et al., "Selectivity Estimation Without the Attribute Value Independence Assumption", Proceedings of the 23rd VLDB Conference, Athens, Greece, 1997, (pp. 486-495, 10 total pages).
Cormode, Graham et al., "Synopses for Massive Data: Samples, Histograms, Wavelets, Sketches", Foundations and Trends in Databases, vol. 4, Nos. 1-3, (2011), DOI: 10.1561/1900000004, (contents 2pgs+pp. 1-294, total 296 pages).
Ioannidis, Yannis "The History of Histograms (abridged)", Proceedings of the 29th VLDB conference, Berlin, Germany, 2003, 12pgs.

* cited by examiner

```
1  template <int BLOCK_SIZE_X>
2  __global__ void getCxShared(double* __restrict__ const x, const unsigned int x,
3                              const bool direction=0) {
4
5      unsigned int stride = blockDim.x * gridDim.x;
6      __shared__ double xShared[BLOCK_SIZE_X];
7      unsigned int end = (1<<s);
8      for(int globalIdx = threadIdx.x+blockDim.x*blockIdx.x; globalIdx < end; globalIdx+=stride) {
9          xShared[threadIdx.x] = x[globalIdx];
10         __syncthreads();
11         for(int w = 1; w < BLOCK_SIZE_X; w<<=1) {
12             if((threadIdx.x/w)%2 == direction) {
13                 xShared[threadIdx.x]+=xShared[threadIdx.x+direction-2*w];
14             }
15             __syncthreads();
16         }
17         x[globalIdx] = xShared[threadIdx.x];
18     }
```

FIG. 5

```
template <unsigned int iteration>
__global__ void srcCxGlobal(double* __restrict__ const x, const bool direction=0) {
    static constexpr auto offset = 10 << iteration;
    const int myGlobalIdx = threadIdx.x+blockDim.x*blockIdx.x;
    const int blockOffset = (blockIdx.x*1024/offset)*2*offset;
    const int myElementIdx = offset*direction + blockOffset + myGlobalIdx*offset;
    x[myElementIdx]+=x[myElementIdx+offset-2*direction*offset];
}
```

FIG. 6

SELECTIVITY ESTIMATION OF CONJUNCTIVE PREDICATES

BACKGROUND

A query optimizer generates query execution plans based on received database queries. Query execution plans may be generated based on database statistics, such as the estimated cardinality of the received query. Cardinality refers to a number of records of a table which are selected by a query, while selectivity refers to a percentage of records of a table which are selected by a query.

A basic approach for determining the selectivity of a query consisting of several predicates is to determine a selectivity for each predicate and to multiply the determined selectivities. This approach assumes that data values are uniformly distributed and the selectivities of predicates are independent. The maximum entropy method has been suggested as an approach for determining a selectivity estimate for a complete predicate conjunct based on several selectivity estimates for partial predicate conjuncts. Assuming three predicates $p_0$, $p_1$, $p_2$ whose selectivities are estimated to be $s_0=0.5$, $s_1=0.5$, and $s_2=0.5$, a selectivity for $p_0 \wedge p_1$ of $s_{01}=0.4$ and a selectivity for $p_1 \wedge p_2$ of $s_{12}=0.1$, the selectivity of the full predicate conjunct $p_0 \wedge p_1 \wedge p_2$ may be determined as 0.08 using entropy maximization. In contrast, the independence assumption generates a selectivity estimate for the full predicate conjunct of 0.5*0.5*0.5=0.125, which is inconsistent because it is greater than the selectivity for $p_1 \wedge p_2$.

The maximum entropy method derives selectivities for each combination of predicates of a complete predicate conjunct by finding the unique vector $x=(x_0, x_1, \ldots x_{2^z-1})$ (for z predicates) that maximizes the entropy:

$$H(s) = \Sigma_i -x_i \log x_i,$$

subject to the constraints given by any known selectivities of various predicate conjuncts. An iterative scaling algorithm is conventionally used to solve the entropy maximization problem. This algorithm exhibits very slow convergence and a high asymptotic complexity (i.e., $O(m^2 * n)$) in each iteration, where m is the number of known selectivities, z the number of predicates and $n=2^z$. Accordingly, the use of an iterative scaling algorithm to solve the entropy maximization problem is typically unsuitable for use in modern database systems. Newton's method has been considered as an alternative approach, but exhibits similarly unsuitable performance, particularly as the number of known selectivities and/or the number of predicates increases.

Systems for efficiently solving an entropy maximization problem are desired. Such systems may preferably allow for implementation in a modern database management system to estimate selectivities without consumption of undue processing resources or processing time.

BRIEF DESCRIPTION OF THE DRAWINGS

FIG. 5 comprises a code listing of a kernel to compute Cx in shared memory according to some embodiments.

FIG. 6 comprises a code listing of a kernel to compute Cx in global memory according to some embodiments.

DETAILED DESCRIPTION

The following description is provided to enable any person in the art to make and use the described embodiments and sets forth the best mode contemplated for carrying out some embodiments. Various modifications, however, will be readily apparent to those in the art.

Some embodiments provide improved determination of selectivities via an efficient implementation of a Newton's method-based algorithm to solve the entropy maximization problem. Such an implementation may be executed by a Central Processing Unit (CPU) or a Graphics Processing Unit (GPU) to provide suitable performance in some database scenarios. Some embodiments further execute the implementation using a multi-threaded GPU in a manner providing additional performance benefits.

Figure 1:
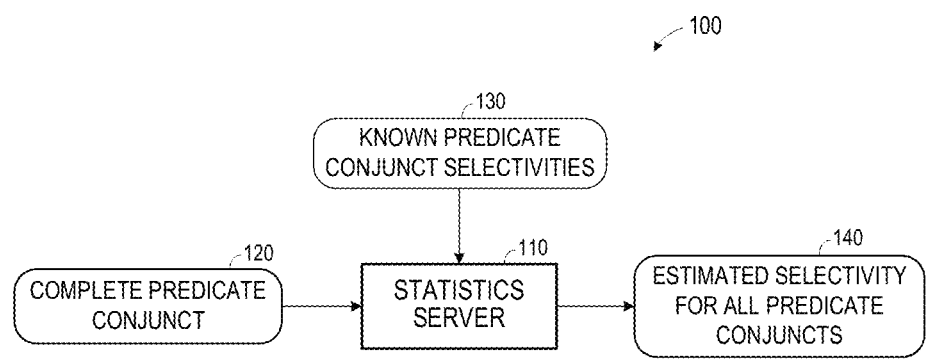
FIG. 1 is a block diagram of a system to estimate selectivity of a query according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Statistics server 110 receives complete predicate conjunct 120, which may comprise a multi-predicate query (e.g., $p_0 \wedge p_1 \wedge p_2$) for which an execution plan is to be generated. Based on known selectivities of one or more conjuncts of the predicates 130 (e.g., $s_{02}$ (corresponding to $p_0 \wedge p_2$), $s_2$ (corresponding to $p_2$)), statistics server 110 generates estimated selectivity for all predicate conjuncts 140.

In some embodiments, statistics server 110 executes generates an estimated selectivity for all predicate conjuncts 140 using a Newton's method-based algorithm to solve a maximum entropy problem. Conventional implementations of such an algorithm exhibit high complexity (e.g., $O(n^2)$), but an implementation according to some embodiments utilizes a recursive procedure that avoids redundant computations and results in a Newton's method-based algorithm with lower computational complexity (e.g., $O(n \log n)$).

Figure 2:
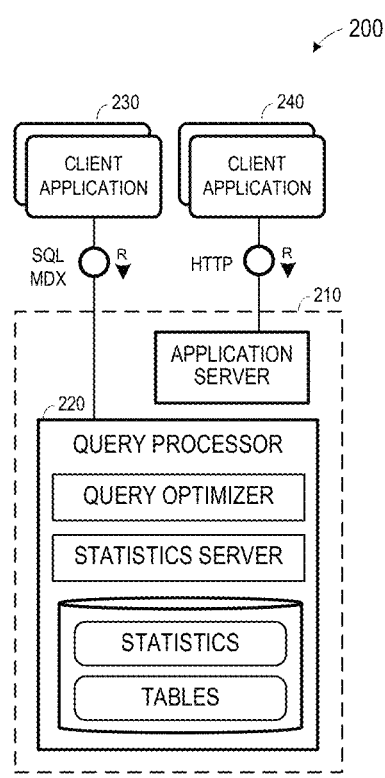
FIG. 2 is a block diagram of a database system according to some embodiments.

FIG. 2 is a block diagram of a database architecture in which selectivities may be determined according to some embodiments. Embodiments are not limited to the FIG. 2 architecture.

Generally, server node 200 receives a query from client applications 230 and 240 and returns results thereto based on data stored within node 200. Node 200 executes program code to provide an application server and query processor 220. The application server provides services for executing server applications. For example, Web applications executing on an application server may receive Hypertext Transfer Protocol (HTTP) requests from client applications 240 as shown in FIG. 2.

Query processor 220 contains the actual stored data and engines for processing the data. Query processor 220 is responsible for processing Structured Query Language (SQL) and Multi-Dimensional eXpression (MDX) statements and may receive such statements directly from client applications 230.

Query processor 220 includes a query optimizer for use in determining query execution plans and a statistics server for determining statistics used to estimate query execution plan costs. The statistics server may generate such statistics based on other stored statistics as described herein. For example, in response to reception of a query consisting of a conjunct of several predicates on a stored table (or view) of server node 200, the statistics server may estimate selectivity of the query based on known selectivities of various conjuncts of the query predicates. According to some embodiments, the statistics server of query processor 220 comprises an implementation of statistics server 110 to generate such estimates.

In some embodiments, the data of server node 200 may comprise one or more of conventional tabular data, row-based data, column-based data, and object-based data. Moreover, the data may be indexed and/or selectively replicated in an index to allow fast searching and retrieval thereof. Server node 200 may support multi-tenancy to separately support multiple unrelated clients by providing multiple logical database systems which are programmatically isolated from one another.

Server nodes 200 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 3:
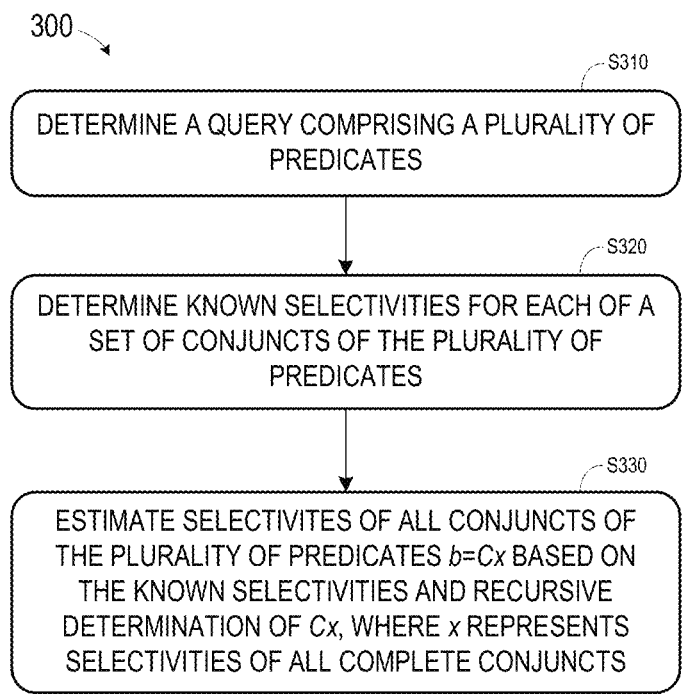
FIG. 3 comprises a flow diagram to estimate selectivity of a query according to some embodiments.

FIG. 3 comprises a flow diagram of process 300 according to some embodiments. In some embodiments, various hardware elements of server node 200 execute program code to perform process 300. Process 300 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A query is initially determined at S310. The query may include a plurality of predicates as is known in the art and may be received by a statistics server for the purpose of estimating corresponding selectivities as described herein. Next, at S320, known selectivities of each of a set of conjuncts of the plurality of predicates are determined. The known selectivities may be pre-stored and/or on-the-fly calculated estimates which are produced from single column histograms, two-dimensional histograms, and/or sampling as is known.

Selectivities of all conjuncts of the plurality of predicates are estimated at S330 based on the known selectivities determined at S320. These selectivities are represented below as b=Cx, where x represents selectivities of all conjuncts of the complete set of predicates. As also described below, Cx may be determined recursively to provide efficient determination of selectivities at S330. The recursive determination of Cx may be leveraged for efficient implementation of other steps of the present Newton's method-based algorithm.

Entropy maximization algorithms require a matrix-based representation of the subject maximum entropy problem, which is not conventionally defined in the case of selectivity estimation. The foregoing description is intended to formalize the entropy maximization problem as a series of vector and matrix operations, from which efficient implementations will then be derived.

The table below summaries aspects of the notation to be used in the following description.

| Notation | Description |
| --- | --- |
| $p_0, \ldots, p_{z-1}$ | z predicates |
| $N = \{0, \ldots, z-1\}$ | set of all predicate indices |
| $n = 2^z$ | abbreviation |
| $T \subseteq 2^N$ | set of indices of known selectivities |
| $m = |T|$ | number of known selectivities |
| $\beta_T$ | vector of known selectivities |
| C | complete design matrix |
| D | (partial) design matrix |
| s(p) | selectivity of predicate p |
| Bit-wise operations | |
| \| | bit-wise or |
| & | bit-wise and |
| ~ | bit-wise complement |
| $i \subseteq j$ | Boolean function returning j = (i\|j) |

Using the above notation, a conjunctive query of z predicates (i.e., a complete predicate conjunct) may be represented as follows:

$$p_0 \wedge \ldots \wedge p_{z-1}$$

The predicates may consist of selection predicates or join predicates.

Let N={0, . . . , z−1} be the set of numbers from 0 to z−1. All subsets X⊆N can be represented as a bit-vector of length z denoted by bv(X) where the set bits indicate the indexes of those elements of N which are also included in the subset X. Further, this bit-vector can be interpreted as a binary number. No distinction is made between the bit-vector and the integer it represents and either may be used. For example, the notation i⊆j denotes the fact that i has a '1' only in those positions where j has a '1', i.e., j=i|j is True.

For any X⊆N, the following formula is defined:

$$\beta(X) := \wedge_{i \in X} p_i$$

i.e., $\beta(X)$ is the conjunction of all predicates $p_i$ whose index i is contained in X. The following table gives a complete overview for z=3, where the bits are ordered from least significant to most significant and where the first column gives the integer value and its bit-vector representation of the index set X and the second column the corresponding conjunction of predicates contained in X. $\beta(i)$ may be used instead of $\beta(X)$ if i is the bit-vector/integer representation of some X.

| bv(X) | $\beta(X)$ |
| --- | --- |
| =100 | $p_0$ |
| =010 | $p_1$ |
| =110 | $p_0 \wedge p_1$ |
| =001 | $p_2$ |
| =101 | $p_0 \wedge p_2$ |
| =011 | $p_1 \wedge p_2$ |
| =111 | $p_0 \wedge p_1 \wedge p_2$ |

The selectivity of $\beta(X)$, i.e., the probability of $\beta(X)$ being true, is denoted by $\hat{\beta}(X)$. In the case of the empty set, the empty conjunct is always true (i.e., $\beta(\emptyset) = \beta(0) = 1$).

A conjunction of literals containing all predicates either positively or negatively is called a complete conjunct. For n=3, the following table contains a list of all complete conjuncts:

| i | $\gamma(i)$ | | | | |
|---|---|---|---|---|---|
| =000 | $\neg p_0$ | $\wedge$ | $\neg p_1$ | $\wedge$ | $\neg p_2$ |
| =100 | $p_0$ | $\wedge$ | $\neg p_1$ | $\wedge$ | $\neg p_2$ |
| =010 | $\neg p_0$ | $\wedge$ | $p_1$ | $\wedge$ | $\neg p_2$ |
| =110 | $p_0$ | $\wedge$ | $p_1$ | $\wedge$ | $\neg p_2$ |
| =001 | $\neg p_0$ | $\wedge$ | $\neg p_1$ | $\wedge$ | $p_2$ |
| =101 | $p_0$ | $\wedge$ | $\neg p_1$ | $\wedge$ | $p_2$ |
| =011 | $\neg p_0$ | $\wedge$ | $p_1$ | $\wedge$ | $p_2$ |
| =111 | $p_0$ | $\wedge$ | $p_1$ | $\wedge$ | $p_2$ |

Two different complete conjuncts can never be true simultaneously. The complete conjuncts have been indexed by their bit-vector representation, where a positive atom corresponds to '1' and a negative atom corresponds to '0'. For a given $X \subseteq N$, the complete conjunct X is denoted by $\gamma(X)$:

$$\gamma(X) = \bigwedge_{i \in X} p_i \wedge \bigwedge_{i \in \bar{X}} \neg P_i$$

The probability of a complete conjunct $\gamma(X)$ for some X being true is denoted by $\gamma(X)$.

For a given $X \subseteq N$, the bit-vectors y of the complete conjuncts $\gamma(Z)$ contributing to $\beta(X)$ can be expressed as all the bit-vectors y which contain a '1' at least at those positions where the bit-vector representation $bv(X)$ of X contains a '1'. That is, $$\{y | y \supseteq bv(X)\}.$$

Consider $X=\{0\}$ ($\triangleq 100$). Then $$\beta(X) = s(p_0 \wedge \neg p_1 \wedge \neg p_2) +$$
$$s(p_0 \wedge p_1 \wedge \neg p_2) + s(p_0 \wedge \neg p_1 \wedge p_2) + s(p_0 \wedge p_1 \wedge p_2),$$

where s (p) denotes the selectivity of the complete conjunct p. For $X=\{0,1\}$ ($\triangleq 110$):

$$\beta(X) = s(p_0 \wedge p_1 \wedge \neg p_2) + s(p_0 \wedge p_1 \wedge p_2).$$

As a special case, for $X=\emptyset$ ($\triangleq 000$), all complete conjuncts contribute to $\beta(\emptyset)$. Further, the sum thereof must be one. Consequently, it is assumed that the empty set is contained in the set of known selectivities T, i.e., $\emptyset \in T$.

In case $T=2^N$, all selectivities are known. Define $n=2^z$. Then, the complete design matrix $A \in \mathbb{R}^{n,n}$ is defined as $$C = (c_{i,j}) = \begin{cases} 1 & \text{if } i \subseteq j \\ 0 & \text{else} \end{cases}$$

where indices are used in $[0, 2^z-1]$. C is unit upper triangular, nonsingular, positive definite, and persymmetric. For z=3:

$$C = \begin{pmatrix} 1 & 1 & 1 & 1 & 1 & 1 & 1 & 1 \\ 0 & 1 & 0 & 1 & 0 & 1 & 0 & 1 \\ 0 & 0 & 1 & 1 & 0 & 0 & 1 & 1 \\ 0 & 0 & 0 & 1 & 0 & 0 & 0 & 1 \\ 0 & 0 & 0 & 0 & 1 & 1 & 1 & 1 \\ 0 & 0 & 0 & 0 & 0 & 1 & 0 & 1 \\ 0 & 0 & 0 & 0 & 0 & 0 & 1 & 1 \\ 0 & 0 & 0 & 0 & 0 & 0 & 0 & 1 \end{pmatrix}$$

This design matrix assists the determination of selectivities for positive conjuncts from probabilities for complete conjuncts. Let $b=(\beta(0), \ldots, \beta(n-1))^t$ the column vector containing all the selectivities $\beta(X)$ for all $X \in 2^N$ and $x=(\gamma(0), \ldots, \gamma(n-1))^t$ the column vector containing all the selectivities for all complete conjuncts. Then, $$Cx=b$$

holds.

Now notation will be established to eliminate rows and columns in some matrix A. Let $A \in \mathbb{R}^{n,n}$ be some matrix. Let $T \subseteq \{0, \ldots, n-1\}$, $m := |T|$, be a set of column indices. Then, the matrix where only the columns in T are retained is denoted $A|_{c(T)}$. Likewise, the matrix derived by retaining only the rows in T is denoted $A|_{r(T)}$. These operations can be expressed via matrix multiplication. For an index set T with $m=|T|$, the matrix $E^{m,n,T} \in \mathbb{R}^{m,n}$ is defined as $$E_{m,n,T}(i, j) = \begin{cases} 1 & \text{if } j = T[i] \\ 0 & \text{else} \end{cases}$$

where T [i] denotes the i-th element of the sorted index set T. For example, for m=4, n=8, T={1,3,5,7}:

$$E_{4,8,T} = \begin{pmatrix} 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{pmatrix}$$

Then, for $A \in \mathbb{R}^{n,n}$ $$A|_{r(T)} = E_{m,n,T} A$$

$$A|_{c(T)} = A(E_{m,n,T})^t$$

holds. For a given subset $T \subseteq \{0, \ldots, n-1\}$ (of known selectivities), only those rows from the complete design matrix C for which there is an entry in T are retained. The problem specific (partial) design matrix D for T is defined as $$D := C|_{r(T)} = E_{m,n,T} C \in \mathbb{R}^{m,n}$$

where $m := |T|$. Clearly, the rank of D is m.

For z predicates, a given vector $\beta_T$ of known selectivities and indices T thereof, the problem is to find the solution to $Dx=\beta_T$ that maximizes the entropy of the solution vector x. That is, the problem to solve can be specified as $$\text{argmax}_x \sum_{i=0}^{n-1} -x_i \log x_i \text{ subject to } Dx = \beta_T \text{ and } x \geq 0$$

where $n=2^z$. Note that $\Sigma_{i=1}^{n-1} x_i = 1$ must be true, but this is implied since it is assumed that $\emptyset \in T$ always holds.

The nine steps below comprise a Newton's method-based algorithm to solve the dual problem of the entropy maximization problem above:

$$\text{argmin}_w \exp(D^t w - 1)^t \vec{1} - \beta_T^t w$$

where it is supposed that the set $\{x \in \mathbb{R}^n: Dx = \beta_T, x \geq 0\}$ has a nonempty interior.

In contrast to iterative scaling, a Newton-based approach to solve the optimization problem exhibits local quadratic convergence. As input, the algorithm receives the vectors b and T of known selectivities and their indices, and some $\epsilon > 0$ to be used in the stop criterion. The algorithm returns the solution x maximizing the entropy and the vector Cx containing the $\beta$-selectivities for all possible predicate conjuncts. Although T does not occur in the algorithm, it is used in the definition of the design matrix D as noted above.

Newton(b($=\beta_T$),T,$\epsilon$)
1. w=0
2. x=exp(−1)
3. while ($\delta > \epsilon$)
4. A=Ddiag(x)D$^t$
5. solve Ay=b−Dx
6. w=w+y
7. x=exp(D$^t$w−1)
8. $\delta = \|b - Dx\|$
9. return (x, Cx)

The steps in the algorithm differ vastly in complexity. The initializations of w and x have complexity O(n) and O(m), respectively, and are thus rather uncritical. The calculation of w=w+z in Line 6 has complexity O(m) and is thus also rather uncritical.

The calculation of A=Ddiag(x)D$^t$ in Line 4 of Newton can be very expensive if implemented literally. Note that diag(x) is a diagonal (n×n)-matrix with x on its diagonal. Using standard matrix multiplication, the complexity of this step is $O(m^*n^2 + m^{2*}n)$. The present inventors have noted that diag (x) contains only zeroes besides the diagonal and conceived of the following more-efficient procedure which leverages this structural condition and does not rely on materializing diag(x):

get_DdiagxDt(D, x)
1. for (0≤i<m, 0≤j<m)
2. s=0
3. for (0≤k<n)
4. s+=D[i,k]*x[k]*D[j,k]
5. A(i, j)=s
6. return A This procedure has complexity $O(m^{2*}n)$ and is therefore significantly more efficient than the naive approach using matrix multiplication.

Ay=b−Dx is solved for y in Line 5 of Newton. Calculating Dx has complexity O(m*n). To solve the equation, note that the (m, m) matrix A=Ddiag(x)D' calculated in step (2) is symmetric, non-singular, and positive definite. Thus, the efficient Cholesky decomposition can be applied to derive a lower triangular matrix L with A=LL$^t$. Then, the solution y can be derived using back substitution. The complexity of this procedure is $O(m^3)$.

D$^t$w is calculated in Line 7, which has complexity O(m*n). Line 8 with complexity O(m) is also uncritical, as Dx has been already calculated in Line 5. In Line 9, the product of the complete design matrix C with the primal solution vector x is calculated. Using standard matrix multiplication, this step has complexity O(m*n).

The present inventors have derived a reduction-based algorithm for implementing the above Newton's method-based algorithm that avoids redundant computations, resulting in lower computational complexity than the above-described implementation thereof. The reduction-based algorithm may be executed at S330 and is based on a recursive definition of the complete design matrix C.

Assuming the complete design matrix for z predicates is denoted by $C_z \in \mathbb{R}^{n \times n}$ with $n = 2^z$, then $$C_0 = (1)$$

and $$C_{z+1} = \begin{bmatrix} C_z & C_z \\ 0 & C_z \end{bmatrix}$$

characterize the complete design matrix C. Another possibility to define C is to use the Kronecker product $\otimes$. That is, with $$C_1 = \begin{pmatrix} 1 & 1 \\ 0 & 1 \end{pmatrix}$$

what follows is $$C_{z+1} = C_1 \otimes C_z$$

It is desired to efficiently calculate Cx at S330 for some vector $x \in \mathbb{R}^n$ to efficiently implement the Newton-based algorithm. If $x \in \mathbb{R}^n$ is apportioned into two halves $x_1, x_2 \in \mathbb{R}^{n/2}$, it is observed that $$C_z x = \begin{pmatrix} C_{z-1} & C_{z-1} \\ 0 & C_{z-1} \end{pmatrix} \begin{pmatrix} x_1 \\ x_2 \end{pmatrix} = \begin{pmatrix} C_{z-1} x_1 + C_{z-1} x_2 \\ C_{z-1} x_2 \end{pmatrix}$$

The term $C_{z-1} x_2$ occurs twice but has to be calculated only once. Based on this observation, a recursive procedure may be implemented to calculate $C_z x$ in $O(z 2^z)$, i.e. $O(n \log n)$, substituting $n = 2^z$. The algorithmic complexity of the Newton's method-based algorithm may therefore be advantageously reduced from $O(n^2)$ to $O(n \log n)$.

An efficient iterative algorithm get_Cx may further be provided as listed below in order to avoid the overhead of recursion. It is assumed that the in/out argument Cx has been initialized with x. Further, vp_add is an AVX2-based implementation to add two vectors of length h.

void get_Cx(double*Cx, uint z)
1. w=h=s=t=0;
2. for n=1<<z;
3. for (w=2; w<=n; w<<=1)//width
4. for (s=0; s<n; s+=w)//start of first half
5. h=(w>>1); II half of width
6. t=s+h;//start of second half
7. vp_add(Cx+s, Cx+t, h);

A procedure to efficiently calculate C$^t$y can be devised similarly by replacing Cx by Ctx and vp_add(Cx+s, Cx+t, h) by vp_add(Ctx+t, Ctx+s, h). This algorithm may be called get_Ctx to w'.

To leverage the recursive characterization of C to efficiently calculate Dx and D$^t$x, it is noted that for $n = 2^z$ (z being the number of predicates), (1) the complete design matrix C is of dimension (n, n) and (2) the design matrix D is of dimension (m, n). In typical applications m will be much smaller than $n=2^z$.

Since the calculation of Cx in Line 9 of Newton can be implemented efficiently as described above, $Dx=E_{m,n,T}Cx$ can also be evaluated efficiently based on D: $=C|_{r(T)}=E_{m,n,T}C \in \mathbb{R}^{m,n}$ by first calculating Cx and then picking the components contained in T. This evaluation is performed only once during Newton to calculate the expressions Dx in Lines 5 and 8, and Cx in Line 9. Further, $C^t x$ can be calculated efficiently using algorithm get_Ctx. Thus, calculating $D^t w$ in Line 7 can be implemented efficiently by exploiting the fact that $D^t = C^t E_{m,n,T}^T$. w may be embedded into a vector w' in $\mathbb{R}^n$ via $$w'[j] = \begin{cases} w[i] & \text{if } j = T[i] \text{ forsome } i \\ 0 & \text{else} \end{cases}$$

($0 \le i < m$, $0 \le j < n$) and apply algorithm get_Ctx.

An efficient implementation of Line 4 will now be discussed. As Cx has already been calculated, it will be shown how to calculate $(D\text{diag}(x)D^t)$ from Cx. Initially, an efficient algorithm to calculate $(C\text{diag}(v)C^t)$ is provided.

It is noted that $(\text{diag}(v)C^t) = (C\text{diag}(v))^t$. Further, $$(C\text{diag}(x))[j,k] = \sum_{l=0}^{n-1} c_{j,l} \text{diag}(x)[l,k] = c_{j,k} x_k$$

Thus, using $$(C\text{diag}(x)C^t)[i,j] = \sum_{k=0}^{n-1} c_{i,k}(C\text{diag}(x))^t[k,j] =$$

$$\sum_{k=0}^{n-1} c_{i,k}(C\text{diag}(x))[j,k] = \sum_{k=0}^{n-1} c_{i,k} c_{j,k} x_k = \sum_{(i|j) \subseteq k} x_k = (Cx)[i | j]$$

$(C\text{diag}(x)C^t)$ can be calculated from Cx. Since $$D\text{diag}(x)D^t = (E_{m,n,T}C)\text{diag}(x)(E_{m,n,T}C)^t = E_{m,n,T}(C\text{diag}(x)C^t)E_{m,n,T}$$

Cx can be used to fill $(D\text{diag}(x)D^t) \in \mathbb{R}^{m,m}$ via $$(D\text{diag}(x)D^t)[i,j] = (Cx)[T[i]|T[j]]$$

for $0 \le i, j < m$.

The above-described implementation of Newton can be implemented efficiently on a modern CPU or GPU. Implementation on a multi-threaded GPU will, providing even further efficiencies, now be described. The description is focused on the implementation of Cx because, as described above, this operation is the core of the implementation of Lines 4, 7, 8 and 9 of Newton. Efficient GPU implementation of Line 5, the Cholesky decomposition, is also described.

Figure 4:
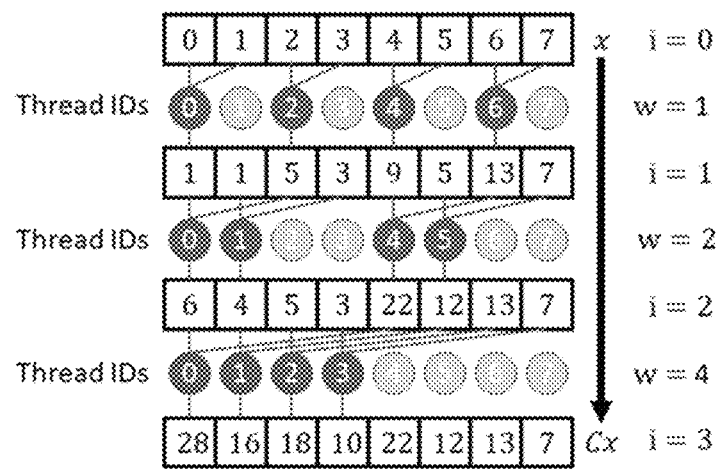
FIG. 4 illustrates a multi-threaded Graphics Processing Unit implementation of Cx according to some embodiments.

Embodiments extend the implementation of get_Cx to support massive multi-threading. FIG. 4 illustrates a parallelization scheme of the extended implementation. The required operations for calculating Cx are shown for x={0, 1,2,3,4,5,6,7} and z=3. Boxes represent the contents of x after each iteration i, and dark (light) circles represent active (inactive) GPU threads. In each iteration, every active thread performs one addition and stores the result. The lines connecting the boxes and circles indicate the flow of data. In each iteration, half of the GPU threads are active while the other half are idle. Such an arrangement allows the use of a simple mapping from thread-id to accessed memory addresses. Increasing the usage of the GPU threads per iteration would require a more complex mapping.

Assuming a maximum number of threads per thread block of 1024, the first ten iterations can be performed without requiring communication between different thread blocks. During these ten iterations, the shared memory of the GPU is used and access to global memory is only required once when loading x into shared memory and once when writing Cx back to global memory. This arrangement is beneficial because shared GPU memory may offer lower latency and significantly higher bandwidth than global memory. Hence, for $z \le 10$, embodiments may use a kernel using shared memory such as shown in listing 500 of FIG. 5. In every iteration of the outer loop processing vector x is advanced by the number of available threads. z predicates results in $n=2^z$ elements to process, i.e. for z=15 there are have $2^{15}=32768$ elements to process. The inner loop of listing 500 adds the elements as illustrated in FIG. 4.

For z>10, and again assuming a maximum number of threads per thread block of 1024, no efficient shared memory implementation is possible as threads of one thread block would need to access shared memory allocated in another thread block. Consequently, all memory accesses should go to global memory and global synchronization through individual kernel launches is required. This global kernel shown in listing 600 of FIG. 6 may be called to compute Cx once for every z>10. Embodiments may use templates to generate these calls at compile time. The parameter direction allows the calculation of both Cx and $C^t x$. When the direction is set to 1, the algorithm proceeds backwards, calculating $C^t x$, as required in Line 7 of Newton using the product $D^t w$.

As described above, solving Ay=b−Dx for y in Line 5 of Newton can be performed using Cholesky decomposition. The cuSolver library from the CUDA toolkit may be used for large problems, i.e. for $m \ge 40$. cusolverDnDpotrf is first relied on to factorize A in a kernel call. Then, the kernel cusolverDnDpotrs is called, where b−Dx is passed as argument and y is received as a result.

As multiple kernel calls are involved in these steps, and each kernel call implies a call overhead of approximately 5-10 μs, a variant of the Cholesky decomposition using only a single kernel call may be implemented. This kernel may be used as a solver for small problems, i.e. m<40. The implementation calculates the solution of the system of equations via Gaussian elimination without pivoting. It is implemented to run in a single thread block using shared memory.

The following is a description of how the various kernels are combined to implement Newton on a GPU according to some embodiments. As shown in the pseudo code below, the initialization in Lines 1-3 and the main loop of Newton are realized in function NewtonGPU.

get_Cx_GPU (x, direction)
   1. y=getCxShared(x,direction)
   2. for w←1 to z−10
   3. Cx=getCxGlobal<10+w>(y,direction)
   4. return Cx
buildMatrixA(b,x)
   1. Cx=get_Cx_GPU(x,0)
   2. (A, Dx)=distribute Cx to A and Dx as described above
   3. return (A, Dx)
productOfDtw(w)
   1. $D^t w$=0
   2. distribute w into x
   3. $D^t w$=get_Cx_GPU(x,1)

4. together with get_Cx_GPU(x,1), in the same kernel also compute
5. x=exp(-D$^t$w)
6. u$_{new}$=x/exp(1)
7. u$_{old}$=u$_{old}$-u$_{new}$
8. return (D$^t$w, u$_{old}$, u$_{new}$, x)

Newton_GPU(b(=β$_T$), T, ∈)
1. w=0
2. b=b*exp(1)
3. x=1
4. while (δ>∈)
5. (A, Dx)=buildMatrixA(b,x)
6. solve Ay=b-Dx for y using cuSolver
7. w=w-y
8. (D$^t$w,u$_{old}$, u$_{new}$, x)=productOfDtw(w)
9. δ=∥u$_{old}$∥$_\infty$
10. swap(u$_{old}$, u$_{new}$)
11. return (get_Cx_GPU(x,0))

While the logic of the main loop is the same as in Newton, the code is organized to minimize the number of kernel calls. For example, in Line 5 both Ddiag(x)D$^t$ and b-Dx are computed in a single kernel call to buildMatrixA. Cx is first computed calling getCxShared and then, if z>10, getCx-Global is called in a loop for every 10<w≤z. In the second step of kernel buildMatrixA, Cx is gathered from the elements for Dx and A=Ddiag(x)D$^t$ as explained above.

Line 6 of the loop in function Newton_GPU is implemented using the cuSolver library of CUDA as described above for larger problems. Line 7 computes w=w-y using thrust::transform from Thrust, the CUDA C++ template library. Then, Line 8 fuses Line 7 and the computation of b-Dx in Line 8 of Newton into a single kernel productOfDtw. This kernel first distributes vector w into x, and then productOfDtw uses the logic of get_Cx_GPU to compute D$^t$w using direction=1 as a parameter to handle the transposed matrix. As part of this computation the vectors u$_{old}$, u$_{new}$ and x can also be calculated in the same kernel. After the call to productOfDtw the vector u$_{old}$ contains the element-wise delta of the last loop iteration. This vector is used in Line 9 to determine δ to check for convergence of the algorithm. The L$_\infty$ norm and ∈=10$^{-8}$ may be used in a GPU implementation. If convergence is reached, the solution is returned in Line 11 by issuing one final call to get_Cx_GPU(x,0).

Figure 7:
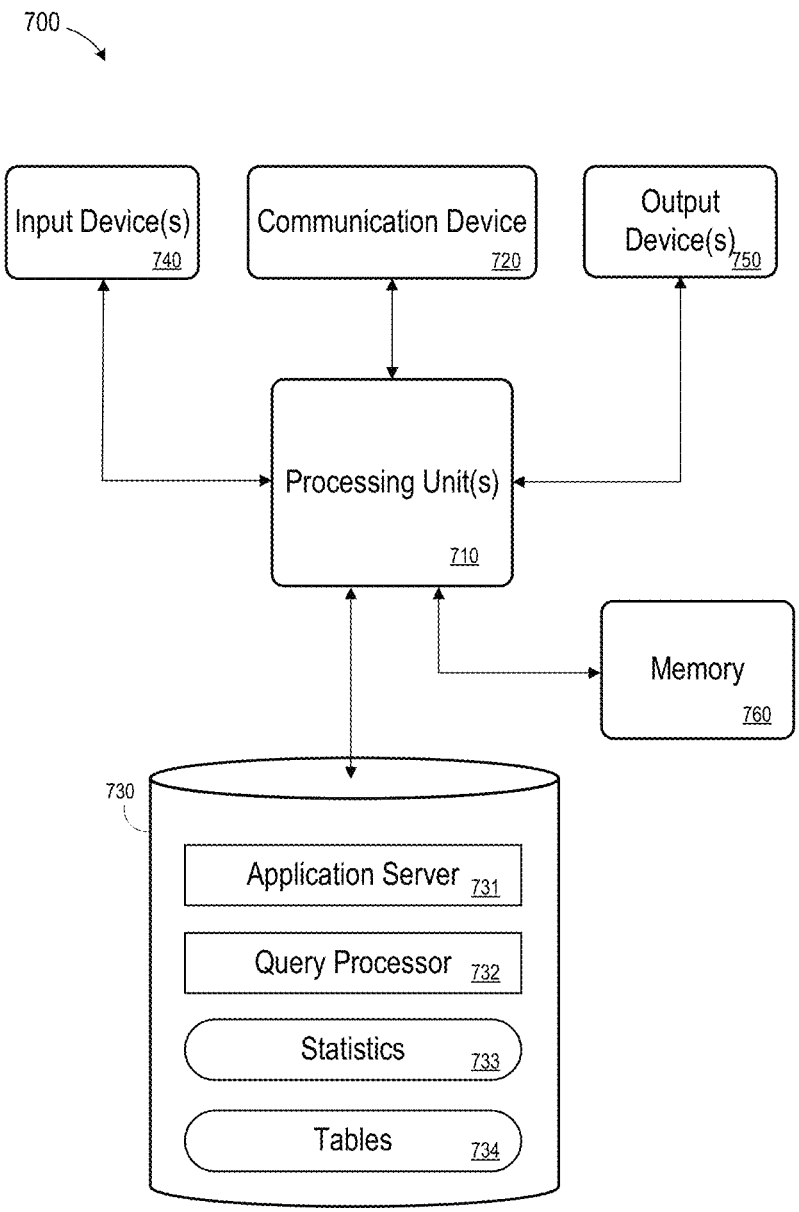
FIG. 7 is a block diagram of a database node according to some embodiments.

FIG. 7 is a block diagram of server node 700 according to some embodiments. Server node 700 may comprise a general-purpose computing apparatus and may execute program code to perform any of the functions described herein. Server node 700 may comprise an implementation of server node 200 in some embodiments. Server node 700 may include other unshown elements according to some embodiments.

Server node 700 includes processing unit(s) 710 operatively coupled to communication device 720, data storage device 730, one or more input devices 740, one or more output devices 750 and memory 760. Communication device 720 may facilitate communication with external devices, such as an external network or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 731 and query processor 732 may each comprise program code executed by processor(s) 710 to cause server 700 to perform any one or more of the processes described herein. Such processes may include estimating selectivities of queries on tables 734 based on statistics 733. Embodiments are not limited to execution of these processes by a single computing device. Data storage device 730 may also store data and other program code for providing additional functionality and/or which are necessary for operation of server 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a graphics processing unit including shared memory and a plurality of threads;
a memory storing processor-executable program code; and
a processing unit to execute the processor-executable program code in order to cause the system to:
determine a query comprising z predicates;
determine known selectivities of each of a set of conjuncts of the z predicates;
estimate selectivities of all conjuncts of the z predicates based on the known selectivities and a recursive determination of Cx, wherein the recursive determination comprises:
loading of x into the shared memory;
at a first iteration:
activation of a first half of the plurality of threads while a second half of the plurality of threads are idle; and
operation of each active thread to sum a respective two values of x stored in the shared memory and to store the result in the shared memory; and
at each one of a plurality of iterations after the first iteration:
activation of a respective first half of the plurality of threads while a second respective half of the plurality of threads are idle, wherein the first respective half of the plurality of threads and the second respective half of the plurality of threads are different for each of the first iteration and the plurality of iterations; and operation of each active thread of the one of the plurality of iterations to sum a respective two results stored in the shared memory and to store the sum in the shared memory; and determine a query execution plan associated with the query based on the estimated selectivities, where x represents selectivities of all complete conjuncts of the z predicates and C is a complete design matrix $$(c_{i,j}) = \begin{cases} 1 & \text{if } i \subseteq j \\ 0 & \text{else} \end{cases},$$

having indices $[0, 2^z-1]$.

2. A system according to claim 1, wherein the recursive determination of Cx comprises recursive determination of $$C_z x = \begin{pmatrix} C_{z-1} x_1 + C_{z-1} x_2 \\ C_{z-1} x_2 \end{pmatrix}.$$

3. A computer-implemented method comprising:

determining a query comprising z predicates;

determining known selectivities of each of a set of conjuncts of the z predicates;

estimating selectivities of all conjuncts of the z predicates based on the known selectivities and a recursive determination of Cx, wherein the recursive determination comprises:

loading x into the shared memory;

at a first iteration:

activating a first half of a plurality of threads of a graphics processing unit while a second half of the plurality of threads are idle; and operating each active thread to sum a respective two values of x stored in a shared memory of the graphics processing unit and to store the result in the shared memory; and at each one of a plurality of iterations after the first iteration:

activating a respective first half of the plurality of threads while a second respective half of the plurality of threads are idle, wherein the first respective half of the plurality of threads and the second respective half of the plurality of threads are different for each of the first iteration and the plurality of iterations; and operating each active thread of the one of the plurality of iterations to sum a respective two results stored in the shared memory and to store the sum in the shared memory; and determining a query execution plan associated with the query based on the estimated selectivities, where x represents selectivities of all complete conjuncts of the z predicates and C is a complete design matrix $$(c_{i,j}) = \begin{cases} 1 & \text{if } i \subseteq j \\ 0 & \text{else} \end{cases},$$

having indices $[0, 2^z-1]$.

4. A method according to claim 3, wherein the recursively determining Cx comprises recursively determining $$C_z x = \begin{pmatrix} C_{z-1} x_1 + C_{z-1} x_2 \\ C_{z-1} x_2 \end{pmatrix}.$$

5. A database node comprising:

a graphics processing unit including shared memory and a plurality of threads;

a data source comprising a plurality of data rows; and a query processor to:

determine a query on the data source comprising z predicates;

determine known selectivities on the plurality of data rows of each of a set of conjuncts of the z predicates; and estimating selectivities on the plurality of data rows of all conjuncts of the z predicates based on the known selectivities and a recursive determination of Cx, wherein the recursive determination comprises:

loading of x into the shared memory;

at a first iteration:

activation of a first half of the plurality of threads while a second half of the plurality of threads are idle; and operation of each active thread to sum a respective two values of x stored in the shared memory and to store the result in the shared memory; and at each one of a plurality of iterations after the first iteration:

activation of a respective first half of the plurality of threads while a second respective half of the plurality of threads are idle, wherein the first respective half of the plurality of threads and the second respective half of the plurality of threads are different for each of the first iteration and the plurality of iterations; and operation of each active thread of the one of the plurality of iterations to sum a respective two results stored in the shared memory and to store the sum in the shared memory; and determine a query execution plan associated with the query based on the estimated selectivities, where x represents selectivities of all complete conjuncts of the z predicates and C is a complete design matrix $$(c_{i,j}) = \begin{cases} 1 & \text{if } i \subseteq j \\ 0 & \text{else} \end{cases},$$

having indices $[0, 2^z-1]$.

6. A database node according to claim 5, wherein the recursive determination of Cx comprises recursive determination of $$C_z x = \begin{pmatrix} C_{z-1} x_1 + C_{z-1} x_2 \\ C_{z-1} x_2 \end{pmatrix}.$$

* * * * *